United States Patent [19]

Ross

[11] 4,006,373
[45] Feb. 1, 1977

[54] STAGGERED MOTOR CORE

[75] Inventor: James A. Ross, La Jolla, Calif.

[73] Assignee: Rohr Industries, Inc., Chula Vista, Calif.

[22] Filed: Aug. 13, 1975

[21] Appl. No.: 604,253

[52] U.S. Cl. .................. 310/13; 104/148 LM
[51] Int. Cl.² .......................... H02K 41/02
[58] Field of Search ................ 310/12–14, 310/216–218; 104/148 LM, 148 MS, 148 R

[56] References Cited
UNITED STATES PATENTS

| 3,610,972 | 10/1971 | Pelenc ................... 310/13 |
| 3,675,585 | 7/1972 | Wiart et al. ............. 104/148 LM |
| 3,735,162 | 5/1973 | Alth ...................... 310/13 |
| 3,886,383 | 5/1975 | Ross et al. .............. 310/12 |

Primary Examiner—Donovan F. Duggan
Attorney, Agent, or Firm—Patrick J. Schlesinger; Frank D. Gilliam

[57] ABSTRACT

An improved laminated motor core for a linear induction motor utilizing windings. The pole piece portion of the core has at least one laterally offset section along its length. There is additionally provided a core having a plurality of offsets along its length as well as cores with pole pieces rectilinearly tapered toward their face.

4 Claims, 6 Drawing Figures

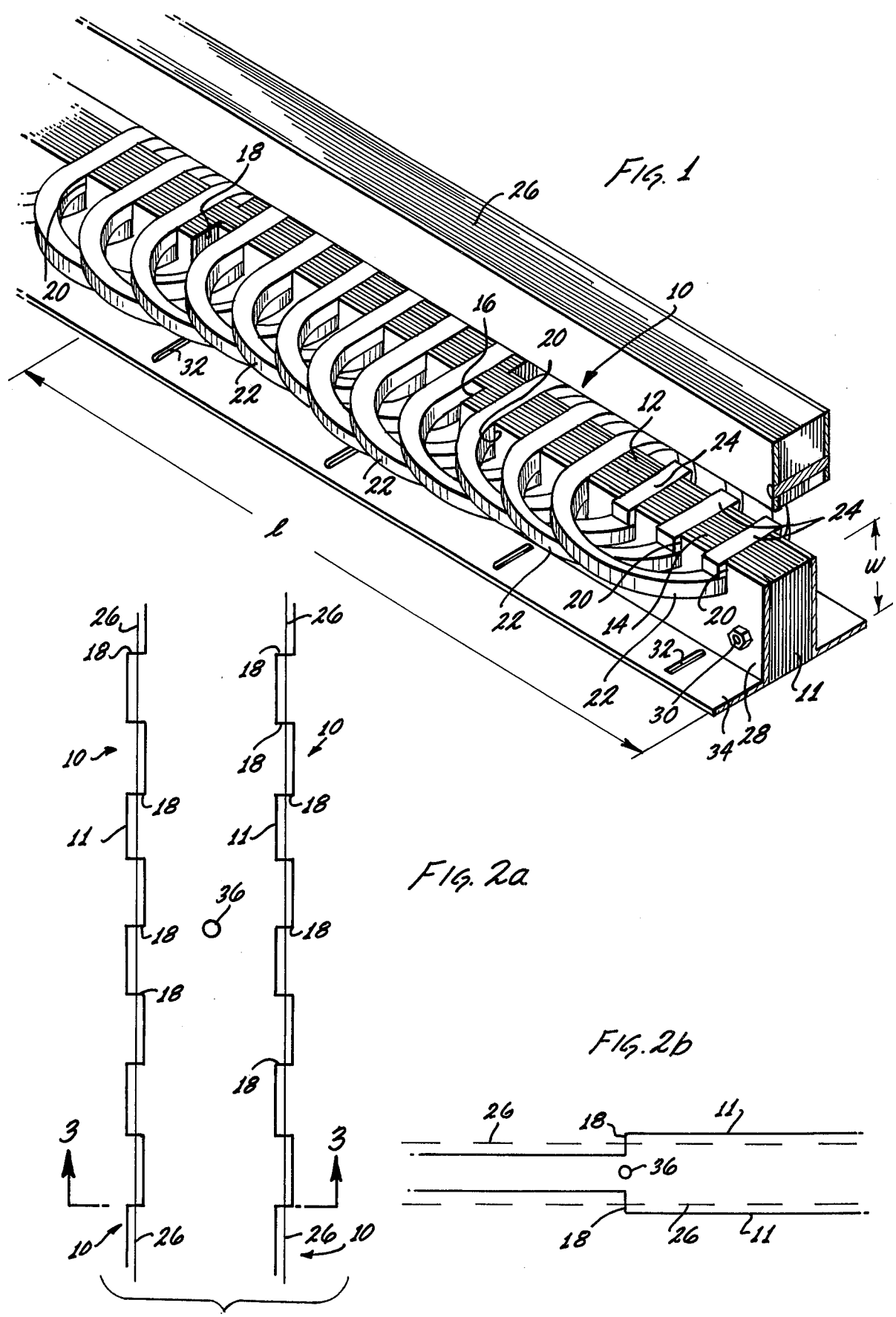

STAGGERED MOTOR CORE

BACKGROUND OF THE INVENTION

The present invention relates to a laminated core for a linear induction motor and more particularly to a core for a linear induction motor having longitudinal sections laterally offset on either side of the mean center line along its length.

Linear induction motors utilizing various cores have found wide spread use for propelling surface supported vehicles. It was found, however, that the available cores were not particularly efficient for utilizaton in linear induction motors for providing the combined suspension, propulsion and guidance of a vehicle, such as disclosed in U.S. Pat. No. 3,736,880, the inventor being the inventor of the instant application and assigned to the assignee of the instant invention.

Improvements to the conventional core are disclosed in U.S. Pat. No. 3,886,383, the inventor and the assignee being the same as the instant invention.

The present linear induction motors employing state of the art motor cores provide adequate stability in roll, pitch thrust, heave and yaw, but may fail to provide adequate lateral displacement stability.

It would obviously be advantageous to provide a motor core structure for use with conventional rail width and means of construction that would provide greater stability of the motor's lateral displacement relative to the rail.

SUMMARY OF THE INVENTION

The instant invention provides an improved motor core to overcome the shortcomings of the present state of the art cores.

The core of the instant invention comprises segments longitudinally staggered from side to side along its entire length. Each staggered segment is wound with separate windings. This results in a single continuous motor having uniform thrust with only a single magnetic end effect per motor.

A motor utilizing this core can have its winding segments controlled in a differential manner and therefore provides increased lateral stability.

The foregoing and other features of the invention will become more fully apparent from the following detailed description with reference to the accompanying drawings.

BRIEF DESCRIPTION OF THE DRAWINGS

FIG. 1 is a partial perspective view of one embodiment of the core of the invention.

FIG. 2a is a schematic plan view of a pair of side by side cores each having a plurality of lateral offsets.

FIG. 2b is a schematic plan view of a pair of side by side cores each having two lateral offsets.

DETAILED DESCRIPTION OF THE FIRST EMBODIMENT

Figure 3:
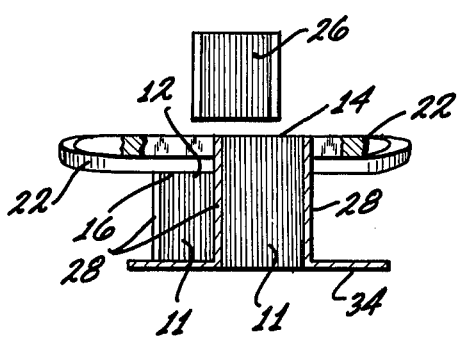
FIG. 3 is a view of FIG. 2 taken along line 3—3.

The cores of linear induction motors, like transformer cores, are generally constructed by the stacking of a series of ferromagnetic laminae either one on top of the other or in a side by side relationship. The laminae are then secured together in a tight physical relationship by various attachment means including, but not limited to, adhesive, bolts, and external brackets, see FIG. 1. It is essential that the laminae be held together with sufficient force to prevent vibration therebetween when power is applied.

Referring now specifically to FIGS. 1, 2a, 2b and 3. A motor 10 having a core 11 constructed of side by side stacked laminae 12, 14, 16 of different lengths are shown. Laminae 12 are equal in length to $l$ of the core 11 which is the core's longest dimension. The length of 14 and 16 are determined by the number of offsets 18 and the overall core length $l$. There are certain motor requirements that would result in 14 and 16 being of equal length.

The offsets 18 are shown along the entire length of the core and are shown in FIG. 2 as having equal length. This showing should not be considered a limitation of this invention. The offsets may have different lengths choosen to provide ideal stability conditions for different motor and rail combinations. Each of the offsets is provided with a transverse slot 20 for receiving the windings 22 shown. Lap windings are shown, but other types of well known motor winding configurations may be utilized equally as well as those shown to produce the invention. Spacers 24 are provided where required to confine the motor windings to the core. Obviously no spacer is required where a pair of windings 22 are received one on top of the other in each slot 20. A rail 26 also of laminae construction is shown superposed in its working relationship with the motor.

The brackets 28, previously described, are formed to conform with the offsets of the motor and are secured to the laminai and confining the laminae therebetween. One example for securing the laminai is by bolt and nut combinations 30 spaced along the motor as shown. Slots 32 in the base member 34 provides a means to fixedly secure the motor and core to a supporting medium not shown.

FIG. 2 further shows the relationship of a pair of motors 10 fixedly mounted in a side by side spaced relationship ship for use on a single vehicle. The relative position of rails 26 with respect to the motor core 11 under normal operation conditions are shown.

FIG. 3 is a cutaway end view of the motor 10 of FIG. 1.

THE DETAILED DESCRIPTION OF THE SECOND PREFERRED EMBODIMENT

Figure 4:
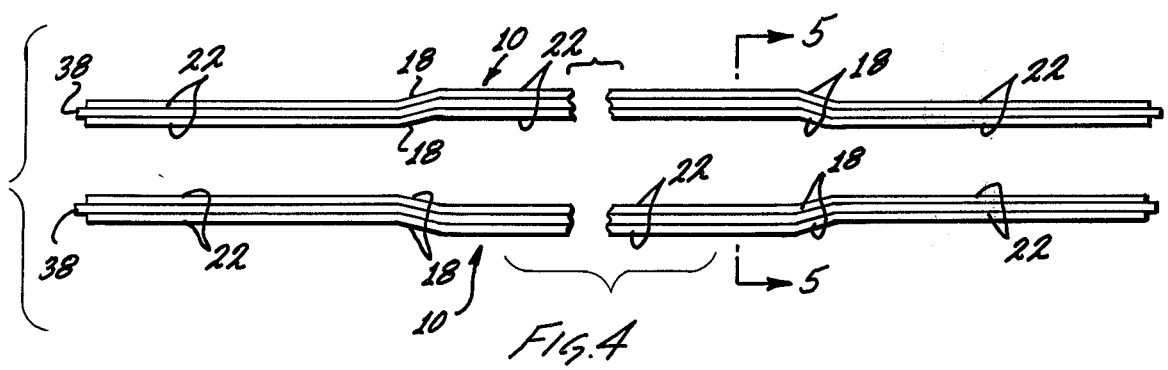
FIG. 4 is a partial plan view of a core for a three segmented motor.
Figure 5:
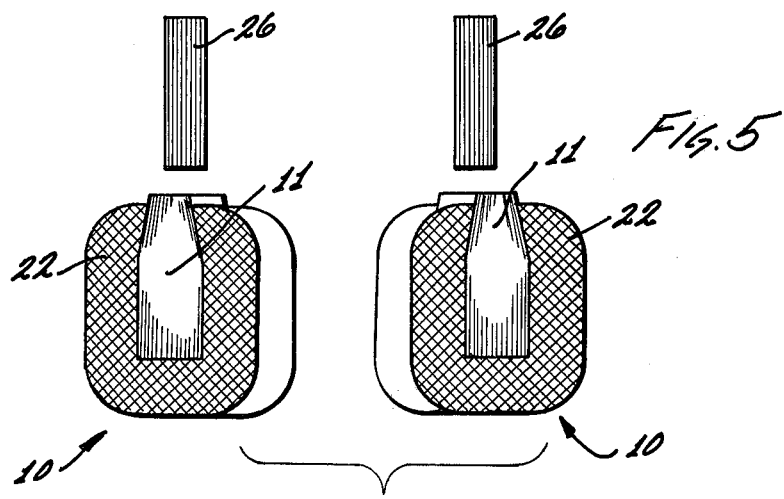
FIG. 5 is an end view of a superposed rail and three segmented motor having gramme rings and a tapered pole pieces.

Referring now to FIGS. 4 and 5. The core 38 of the pair of motors 10 shown is constructed in a manner similar to the first preferred embodiment except the laminae are formed from continuous lengths at the offsets 18 rather than by a plurality of cut laminae of different lengths. The motor shown includes a single offset portion in the core having a length equal to approximately one-third of the overall length $l$ of the core. The windings 22 of FIG. 4 are not shown in detail, but schematically in an envelope form surrounding the core. These windings could be of any type or combination of types known as the motor art.

FIG. 5 shows the end view of the motor 10 of FIG. 4 taken along line 5—5 of FIG. 4. The motors shown employ gramme ring windings and the motor cores 11 have a trapezoidal cross-section configuration according to the aforementioned U.S. Pat. No. 3,886,383.

The windings of the two embodiments are connected to power supplies in a conventional manner well known in the linear induction art and fully explained in aforementioned U.S. Pat. No. 3,736,880. It should be noted that maximum motor stability is accomplished when each offset has separate windings controlled from separate power supplies in a manner taught by the last referenced U.S. Pat.

This invention may be embodied in other specific forms without departing from the spirit or essential characteristics thereof. The present embodiments are thereofore to be considered in all aspects as illustrated and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An improved core for a linear induction motor comprising:
    a pole piece portion having a plurality of spaced apart pole pieces along the length of said core, at least one of said plurality of pole pieces is laterally offset from an adjacent one of said plurality of pole pieces.
2. The invention as defined in claim 1, wherein a plurality of pole pieces are laterally offset from adjacent pole pieces.
3. The invention as defined in claim 1, wherein a plurality of pole pieces having a first longitudinal center line are laterally offset from a plurality of pole pieces having a second longitudinal center line.
4. The invention as defined in claim 3, wherein said first and second center lines are parallel.

* * * * *